(No Model.)
R. KNAACK.
WATER REGULATOR.
No. 601,265. Patented Mar. 29, 1898.
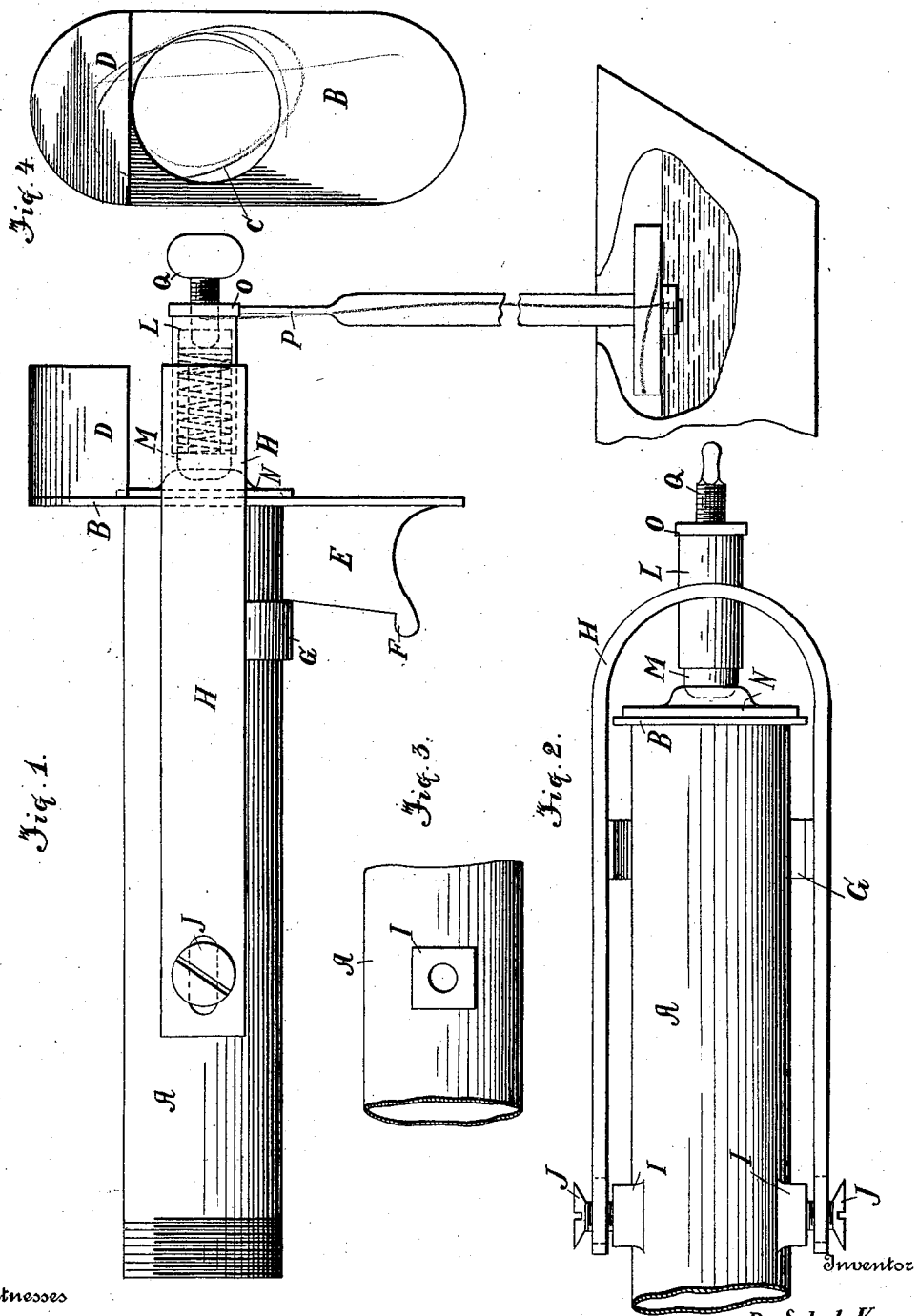
Witnesses
O. Seiffert
Rosalun Smith
Inventor
Rudolph Knaack
per L. G. Susemihl,
Attorney

UNITED STATES PATENT OFFICE.

RUDOLPH KNAACK, OF STOCKTON, IOWA.

WATER-REGULATOR.

SPECIFICATION forming part of Letters Patent No. 601,265, dated March 29, 1898.

Application filed October 18, 1897. Serial No. 655,520. (No model.)

*To all whom it may concern:*

Be it known that I, RUDOLPH KNAACK, a citizen of the United States, residing at Stockton, in the county of Muscatine and State of Iowa, have invented certain new and useful Improvements in Automatic Water-Regulators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in automatic water-regulators; and it consists in a pipe, a vertical perforated plate secured to its end and through which the water flows, and a vertically-sliding valve combined with a bail or guide which is loosely attached to the end of the pipe, a cylinder attached to the outer end of the bail, a spring-actuated valve-rod carried by the cylinder, a set-screw to regulate the pressure of the spring, and a float which is operated by the water in the tank, as will be more fully described hereinafter.

The object of my invention is to provide means for regulating the flow of water into a tank, so that when the water has reached a certain level the flow will be automatically cut off.

In the accompanying drawings, Figure 1 represents a side elevation of a water-regulator which embodies my invention complete. Fig. 2 is a plan view of a portion of the same. Fig. 3 is a detail view of the water-pipe, showing the nut. Fig. 4 is a detail view of the valve.

A represents the pipe, through which the water is conducted to the trough and to the outer end of which is secured the vertical plate B, which has the perforation C made through its upper end corresponding in size to the interior diameter of the pipe, and to the upper end of this plate B is secured the protecting-hood D, of any suitable construction. Secured to the under side of the pipe A and to the inner side of the plate B is the combined guide and stop E, which has the shoulder or projection F formed upon its lower end and against which the stop G, secured to the bail H, strikes for the purpose of limiting the distance that the valve and the bail shall drop.

Secured upon opposite sides of the pipe A are the nuts I, and, through the slotted inner ends of the bail, into these nuts are passed the pivotal screws J, upon which the bail swings. The rear ends of the bail are slotted, so that the valve carried by the free end of the bail can accommodate itself to the vertical plate B. The stop G is secured to the inner side of the bail and by striking against the under side of the pipe A regulates the distance that the bail and the valve shall rise.

Extending horizontally through the outer end of the bail is the cylinder L, and in this cylinder is placed the spring-actuated valve-rod M, the inner end of which rod projects through the cylinder and is made round, so as to fit in a correspondingly-shaped socket formed upon the outer side of the valve N. To the outer end of the cylinder L is secured a nut O, which forms a part of the upper end of the rod P, to which the float in the tank is secured. Passing through this nut O is a set-screw Q, which by bearing against the inner end of the valve-rod regulates the pressure of the valve N against the plate B. The spring upon the valve-rod allows the valve to adjust itself to the face of the plate B without binding it in such a manner as to impede its action. The valve N consists of a flat disk which bears directly against the outer side of the plate B and has a vertical play thereon, being supported in position and operated by the valve-rod.

When the water sinks in the tank, the float permits the bail carrying the valve to drop until the stop G strikes against the shoulder F, and then the water escapes freely from the end of the pipe A. As the water rises the float causes the bail and valve to rise and shut off the flow of water correspondingly until the water has reached a certain level, when the valve closes the opening C, so as to shut off all further flow.

It will be seen that the parts which form my invention are very few, simple in construction, and easily operated, and not liable to get out of repair.

Having thus described my invention, I claim—

1. A water-pipe, a perforated plate secured to its end, a bail pivoted upon the pipe, and a valve carried by the bail at its outer end for opening and closing the opening in the plate at the end of the pipe, combined substantially as shown.

2. A water-pipe, a vertical perforated plate secured to its end, a stop-plate E F secured to the under side of the pipe, a bail, a vertically-moving valve carried thereby, and a stop secured to the bail, the parts being combined and arranged to operate, substantially as described.

3. The pipe, the vertical perforated plate secured rigidly to its end, the bail pivoted upon the pipe, and the cylinder extending through the bail, combined with the regulating-screw, the valve-rod placed in the cylinder, the valve which moves against the vertical plate, the float-rod, and the stop for regulating the downward movement of the bail, combined substantially as set forth.

In testimony whereof I affix my signature in presence of two witnesses.

RUDOLPH KNAACK.

Witnesses:
ALEX STOCKDALE,
HENRY FRIEDRICH.